US012328526B2

(12) United States Patent
Fujimoto

(10) Patent No.: US 12,328,526 B2
(45) Date of Patent: Jun. 10, 2025

(54) INFORMATION PROCESSING METHOD, INFORMATION PROCESSING DEVICE, AND NON-TRANSITORY COMPUTER-READABLE STORAGE MEDIUM STORING PROGRAM

(71) Applicant: SEIKO EPSON CORPORATION, Tokyo (JP)

(72) Inventor: Naohiro Fujimoto, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 45 days.

(21) Appl. No.: 18/498,203

(22) Filed: Oct. 31, 2023

(65) Prior Publication Data

US 2024/0146865 A1    May 2, 2024

(30) Foreign Application Priority Data

Oct. 31, 2022  (JP) ................. 2022-174099

(51) Int. Cl.
| | |
|---|---|
| H04N 5/74 | (2006.01) |
| G06V 10/56 | (2022.01) |
| G06V 10/60 | (2022.01) |
| H04N 1/60 | (2006.01) |
| H04N 9/31 | (2006.01) |

(52) U.S. Cl.
CPC .............. *H04N 5/74* (2013.01); *G06V 10/56* (2022.01); *G06V 10/60* (2022.01); *H04N 1/60* (2013.01)

(58) Field of Classification Search
CPC ........ H04N 9/3182; H04N 9/31; H04N 9/317; H04N 9/3147; H04N 9/3179; H04N 5/74; H04N 9/3176; H04N 1/60; G06V 10/56; G06V 10/60

USPC ......... 348/744, 806–808; 353/30, 31, 48, 94
See application file for complete search history.

(56) References Cited

U.S. PATENT DOCUMENTS

| | | | |
|---|---|---|---|
| 2011/0242494 A1* | 10/2011 | Imai ...................... | G03B 21/14 353/30 |
| 2017/0127028 A1 | 5/2017 | Oike et al. | |
| 2021/0136338 A1 | 5/2021 | Kashiwagi et al. | |
| 2021/0136339 A1 | 5/2021 | Kashiwagi et al. | |

FOREIGN PATENT DOCUMENTS

| | | |
|---|---|---|
| JP | 2017-083672 A | 5/2017 |
| JP | 2018-032922 A | 3/2018 |
| JP | 2021-071608 A | 5/2021 |
| JP | 2021-071609 A | 5/2021 |

* cited by examiner

*Primary Examiner* — Sherrie Hsia
(74) *Attorney, Agent, or Firm* — Dority & Manning, P.A.

(57) ABSTRACT

An information processing method includes: determining a brightness of a first projector included in a first projector group, based on a first brightness of a first image group projected in a first area on a projection surface by the first projector group and a second brightness of a second image group projected in a second area on the projection surface by a second projector group; and determining at least one of a correction value of a color used by the first projector and a correction value of a color used by a second projector included in the second projector group, based on a color of a first image projected in the first area by the first projector and a color of a second image projected in the second area by the second projector.

9 Claims, 7 Drawing Sheets

INFORMATION PROCESSING METHOD, INFORMATION PROCESSING DEVICE, AND NON-TRANSITORY COMPUTER-READABLE STORAGE MEDIUM STORING PROGRAM

The present application is based on, and claims priority from JP Application Serial Number 2022-174099, filed Oct. 31, 2022, the disclosure of which is hereby incorporated by reference herein in its entirety.

BACKGROUND

1. Technical Field

The present disclosure relates to an information processing method, an information processing device, and a non-transitory computer-readable storage medium storing a program.

2. Related Art

According to the related art, when a plurality of projectors are used in combination, an adjustment is performed so that the difference in color or brightness between the individual projectors becomes less visible. For example, JP-A-2021-71608 discloses a technique of performing a brightness adjustment and a color adjustment for a plurality of projectors projecting an image on one display surface.

In the method described in JP-A-2021-71608, in the brightness adjustment, the brightness of the plurality of projectors projecting one composite image is estimated, and based on the projector with the lowest brightness, the brightness of the other projectors is lowered. In the color adjustment, the colors of the images projected by the projectors are estimated, and based on the average value of the colors of the plurality of projectors projecting one composite image, the color of each projector is adjusted. This method can properly adjust the colors of the plurality of projectors. However, since the brightness of the other projector is lowered based on the projector with the lowest brightness, the method has a problem in that the brightness of the image projected on the display surface is lowered.

SUMMARY

According to an aspect of the present disclosure, an information processing method includes: determining a brightness of a first projector included in a first projector group including a plurality of projectors, based on a first brightness of a first image group projected in a first area on a projection surface by the first projector group and a second brightness of a second image group projected in a second area on the projection surface partly overlapping the first area by a second projector group that includes a plurality of projectors and that is different from the first projector group; and determining at least one of a correction value of a color used by the first projector and a correction value of a color used by a second projector included in the second projector group, based on a color of a first image projected in the first area by the first projector and a color of a second image projected in the second area by the second projector.

According to another aspect of the present disclosure, an information processing device includes at least one processor. The at least one processor executes: determining a brightness of a first projector included in a first projector group including a plurality of projectors, based on a first brightness of a first image group projected in a first area on a projection surface by the first projector group and a second brightness of a second image group projected in a second area on the projection surface partly overlapping the first area by a second projector group that includes a plurality of projectors and that is different from the first projector group; and determining at least one of a correction value of a color used by the first projector and a correction value of a color used by a second projector included in the second projector group, based on a color of a first image projected in the first area by the first projector and a color of a second image projected in the second area by the second projector.

According to still another aspect of the present disclosure, a non-transitory computer-readable storage medium storing a program executable by a computer is provided. The program causes the computer to execute: determining a brightness of a first projector included in a first projector group including a plurality of projectors, based on a first brightness of a first image group projected in a first area on a projection surface by the first projector group and a second brightness of a second image group projected in a second area on the projection surface partly overlapping the first area by a second projector group that includes a plurality of projectors and that is different from the first projector group; and determining at least one of a correction value of a color used by the first projector and a correction value of a color used by a second projector included in the second projector group, based on a color of a first image projected in the first area by the first projector and a color of a second image projected in the second area by the second projector.

DESCRIPTION OF EMBODIMENTS

An embodiment of the present disclosure will now be described with reference to the drawings.

1. Outline of Display System

Figure 1:
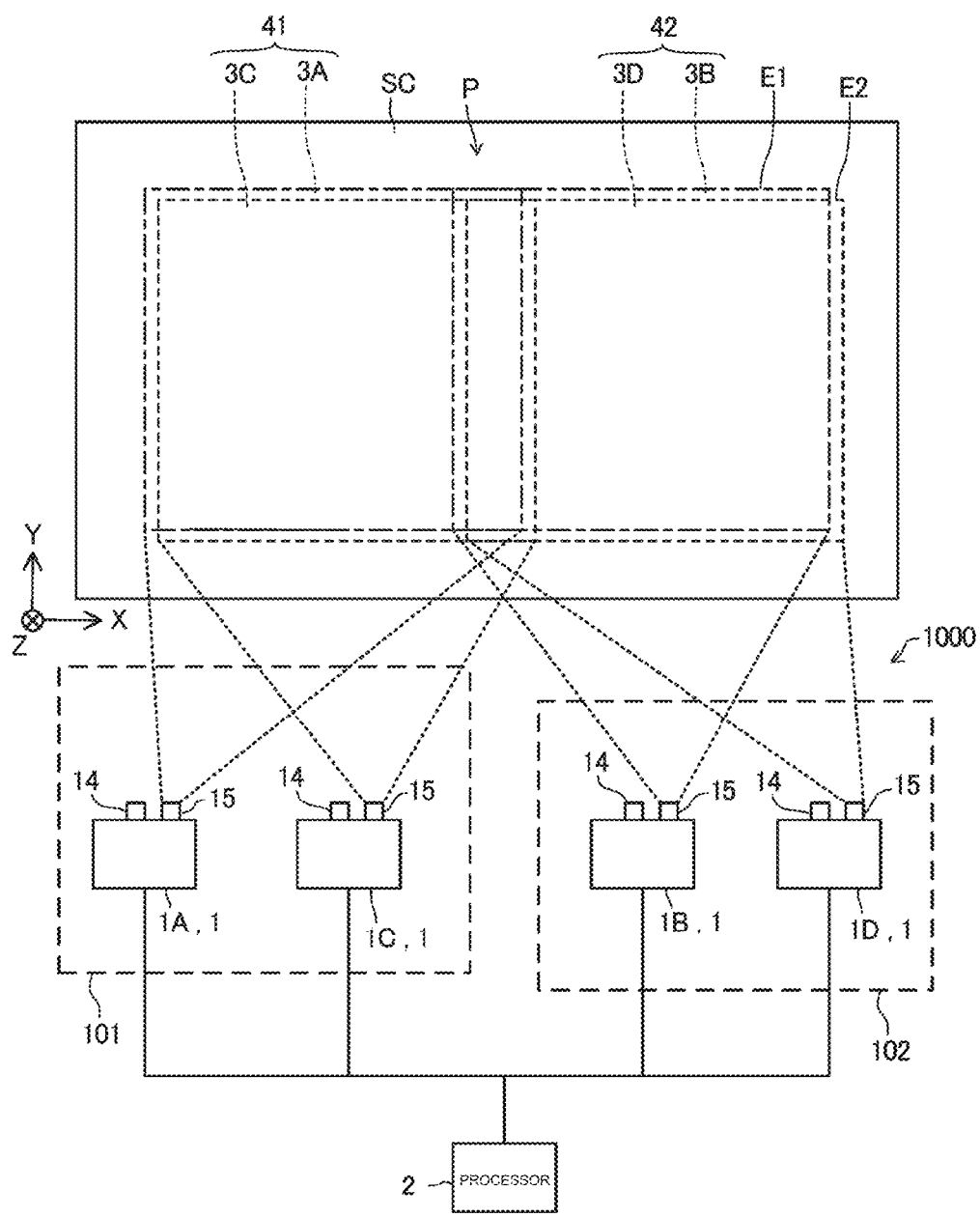
FIG. 1 shows a configuration example of a display system.
Figure 2:
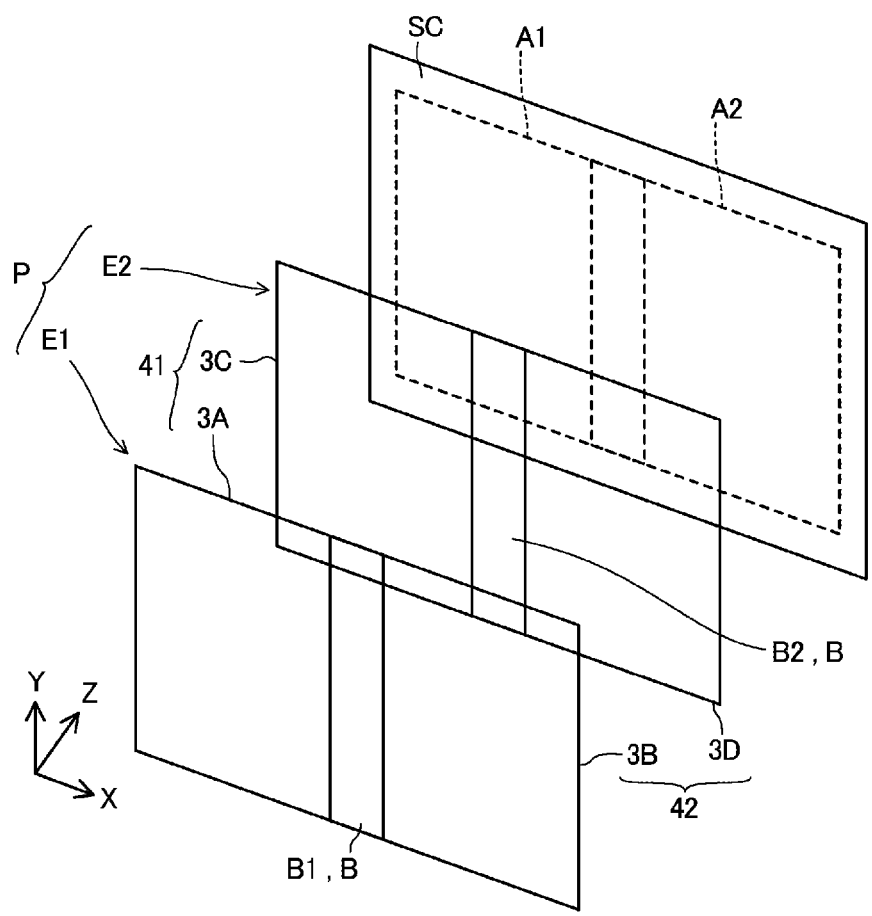
FIG. 2 shows a configuration example of a projection image.

FIG. 1 shows an example of a projection system 1000. FIG. 2 shows a configuration example of a projection image P projected on a projection surface SC by the projection system 1000.

The projection system 1000 includes a plurality of projectors 1 and a control device 2. In this embodiment, an example where the projection system 1000 includes four projectors 1 is described. In the description below, the four projectors 1 are defined as a first projector 1A, a second projector 1B, a third projector 1C, and a fourth projector 1D. These projectors are described as the projector 1 when not distinguished from each other. The control device 2 is equivalent to an example of an information processing device.

The projector 1 projects the projection image P onto the projection surface SC. The projection image P is formed of a plurality of images that are projected by the plurality of projectors 1 and that are superimposed on each other and juxtaposed with each other. To describe this more in detail, the first projector 1A projects a first image 3A onto the projection surface SC. The second projector 1B projects a second image 3B onto the projection surface SC. The third projector 1C projects a third image 3C. The fourth projector 1D projects a fourth image 3D. The first image 3A, the second image 3B, the third image 3C, and the fourth image 3D form one projection image P on the projection surface SC. In FIG. 1, the first image 3A, the second image 3B, the third image 3C, the fourth image 3D, a first full image E1, and a second full image E2 are shifted from each other as a matter of convenience so as to be easily distinguished from each other. However, in practice, the first image 3A, the second image 3B, the third image 3C, the fourth image 3D, the first full image E1, and the second full image E2 are superimposed on each other in a common area on the projection surface SC.

The projection surface SC is a surface where an image is made visible by image light projected by the projector 1. The projection surface SC may be a curtain or a hard flat surface. The projection surface SC may be, for example, a screen for projector, a wall, ceiling or floor of a building, or other surfaces. The projection surface SC may be a flat surface or a curved surface. In this embodiment, the projection surface SC is illustrated and described as a flat surface for the sake of understanding.

As shown in FIG. 2, in this embodiment, a first area A1 and a second area A2 are arranged on the projection surface SC. The projection area arranged on the projection surface SC is not limited to the first area A1 and the second area A2. The projector 1 may project an image in three or more areas.

The first image 3A and the third image 3C are projected, superimposed on each other in the first area A1 on the projection surface SC. The second image 3B and the fourth image 3D are projected, superimposed on each other in the second area A2 on the projection surface SC. Therefore, the first projector 1A and the third projector 1C perform stack projection on the projection surface SC, and the second projector 1B and the fourth projector 1D perform stack projection on the projection surface SC. The first image 3A and the third image 3C form a first image group 41. In other words, the first image group 41 is an image group including a plurality of images projected in the first area A1 and includes the first image 3A and the third image 3C. Similarly, the second image 3B and the fourth image 3D form a second image group 42.

In the projection system 1000, a plurality of projectors 1 performing stack projection form a projector group. A plurality of projectors 1 projecting an image in the same area on the projection surface SC are defined as a projector group. In this embodiment, the first projector 1A and the third projector 1C projecting an image in the first area A1 are included in a first projector group 101. The second projector 1B and the fourth projector 1D projecting an image in the second area A2 are included in a second projector group 102. The first projector group 101 corresponds to the first image group 41. The second projector group 102 corresponds to the second image group 42.

The first area A1 and the second area A2 are areas adjacent to each other on the projection surface SC and partly overlap each other. FIGS. 1 and 2 show an example where the first area A1 and the second area A2 overlap each other. In this example, the first image 3A and the second image 3B are projected in a tiled form, partly overlapping each other, and thus form the first full image E1. Similarly, the third image 3C and the fourth image 3D are projected in a tiled form and thus form the second full image E2.

In the projection system 1000, the order of the first image 3A and the third image 3C and the order of the second image 3B and the fourth image 3D are not prescribed. Therefore, the first image 3A and the fourth image 3D can be projected in a tiled form and the second image 3B and the third image 3C can be projected in a tiled form. That is, the combination of images projected in the first area A1 and the combination of images projected in the second area A2 are not univocal. In this embodiment, combinations of images are set by an input from a user, as described later.

In the first full image E1, so-called edge blending is performed on a superimposition area B1 where the first image 3A and the second image 3B overlap each other. Edge blending is processing in which light reduction is performed, for example, in the superimposition area B1 where the first image 3A overlaps the second image 3B, thus reducing the difference between the brightness in the superimposition area and the brightness in a non-superimposition area. Similarly, edge blending is performed on a superimposition area B2 where the third image 3C and the fourth image 3D overlap each other.

The control device 2 is a device having a data processing function and a communication function. The control device 2 is, for example, a PC (personal computer), a tablet computer, a smartphone, or other devices. The control device 2 may be a device installed in one of the first projector 1A, the second projector 1B, the third projector 1C, and the fourth projector 1D. In this case, the projector 1 with the control device 2 installed therein, of the first projector 1A, the second projector 1B, the third projector 1C, and the fourth projector 1D, can be referred to as a main projector.

The control device 2 is coupled in a mutually communicable manner to each of the first projector 1A, the second projector 1B, the third projector 1C, and the fourth projector 1D. The control device 2 on one hand and the first projector 1A, the second projector 1B, the third projector 1C, and the fourth projector 1D on the other hand are connected, for example, via a wired LAN (local area network) or a wireless communication network and execute communication. As the wireless communication network, for example, Wi-Fi, Bluetooth, or other wireless communication technologies can be applied. Wi-Fi is a registered trademark. Bluetooth is a registered trademark. The control device 2 controls the first projector 1A, the second projector 1B, the third projector 1C, and the fourth projector 1D.

2. Configuration of Projector

In this embodiment, the configuration of the first projector 1A, the second projector 1B, the third projector 1C, and the fourth projector 1D is not limited. However, in this embodiment, an example where these projectors have the same configuration is described.

Figure 3:
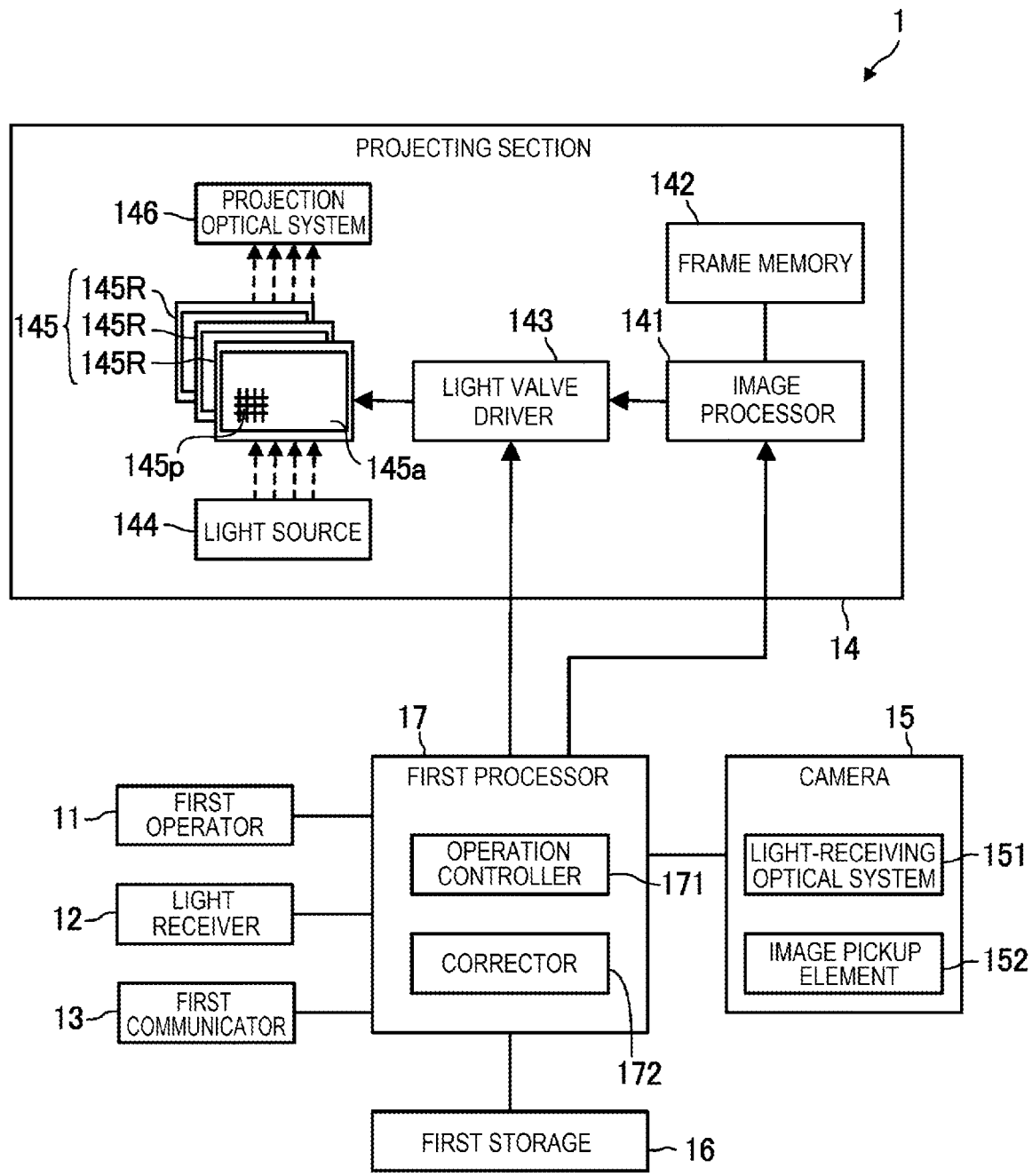
FIG. 3 is a block diagram of a projector.

FIG. 3 is a block diagram of the projector 1. The projector 1 includes a first operator 11, a light receiver 12, a first communicator 13, a projecting section 14, a camera 15, a first storage 16, and a first processor 17.

The first operator 11 has an operating element and accepts an input operation to the operating element by the user. The operating element is, for example, various operation buttons, operation keys, or a touch panel. The first operator 11 is provided at the casing of the projector 1. The first operator 11 can also be referred to as an input interface device.

The light receiver 12 has a light receiving element that receives an infrared signal based on an input operation to a remote controller, not illustrated, from the remote controller. The remote controller has various operation buttons, operation keys, or a touch panel to accept an input operation.

The first communicator 13 is a communication device that communicates with the control device 2, and includes a transmitter and a receiver. The form of communication between the first communicator 13 and the control device 2 is a wired LAN, as described above. However, the form of communication between the first communicator 13 and the control device 2 is not limited to a wired LAN.

The projecting section 14 is an optical device that projects an image onto the projection surface SC and thus displays the image on the projection surface SC. The projecting section 14 includes an image processor 141, a frame memory 142, a light valve driver 143, a light source 144, a liquid crystal light valve for red 145R, a liquid crystal light valve for green 145G, a liquid crystal light valve for blue 145B, and a projection optical system 146. Hereinafter, the liquid crystal light valve for red 145R, the liquid crystal light valve for green 145G, and the liquid crystal light valve for blue 145B are referred to as the liquid crystal light valve 145 when these light valves need not be distinguished from each other.

The image processor 141 is formed of a single or a plurality of circuits such as an image processor. The image processor 141 receives, for example, an image signal from the first processor 17. The image processor 141 may receive an image signal from an image supply device. The image supply device is, for example, the control device 2. The image supply device may be a different device from the control device 2. The different device from the control device 2 is, for example, a PC. The image supply device is not limited to a PC and may be, for example, a tablet terminal, a smartphone, a video player, a DVD (digital versatile disc) player, a Blu-ray disc player, a hard disk recorder, a television tuner device, or a video game machine.

The image processor 141 loads the image signal into the frame memory 142. The frame memory 142 is formed of, for example, a storage device such as a RAM (random-access memory). The image processor 141 performs image processing on the image signal loaded in the frame memory 142 and thus generates a drive signal.

The image processing executed by the image processor 141 includes, for example, geometric correction processing to correct a keystone distortion of an image projected by the projecting section 14. The image processor 141 may execute other image processing, for example, resolution conversion processing, in addition to the geometric correction processing. In the resolution conversion processing, the image processor 141 converts the resolution of an image represented by an image signal, for example, to the resolution of the liquid crystal light valve 145. The other image processing is not limited to the resolution conversion processing. The other image processing may be, for example, OSD (on-screen display) processing to superimpose an OSD image on an image represented by an image signal provided from the image supply device. The other image processing may also be so-called gamma processing to execute gamma correction.

The light valve driver 143 is formed of, for example, a circuit such as a driver. The light valve driver 143 generates a drive voltage, based on the drive signal provided from the image processor 141. The light valve driver 143 applies the drive voltage to the liquid crystal light valve 145 and thus drives the liquid crystal light valve 145.

The light source 144 is, for example, an LED (light-emitting diode). The light source 144 is not limited to an LED and may be, for example, a xenon lamp, an ultra-high-pressure mercury lamp, or a laser light source. The light source 144 emits light. The light emitted from the light source 144 becomes incident on an optical integration system, not illustrated. The optical integration system reduces the unevenness in the luminance distribution of the incident light. After passing through the optical integration system, the light emitted from the light source 144 is separated into color light components of red, green, and blue, which are the three primary colors of light, by a color separation system, not illustrated. The red color light component becomes incident on the liquid crystal light valve for red 145R. The green color light component becomes incident on the liquid crystal light valve for green 145G. The blue color light component becomes incident on the liquid crystal light valve for blue 145B.

The liquid crystal light valve 145 is formed of a liquid crystal panel having a pair of transparent substrates with a liquid crystal provided between the substrates, or the like. The liquid crystal light valve 145 has a rectangular pixel area 145a including a plurality of pixels 145p arranged in a matrix. In the liquid crystal light valve 145, a drive voltage based on an image signal is applied to the liquid crystal at each pixel 145p. When the light valve driver 143 applies the drive voltage to each pixel 145p, the light transmittance of each pixel 145p is set to be the light transmittance based on the drive voltage. The light emitted from the light source 144 passes through the pixel area 145a and is thus modulated. Therefore, an image based on the image signal is formed for each color light. The liquid crystal light valve 145 is an example of a light modulation device.

The images of the individual colors are combined together at each pixel 145p by a light combining system, not illustrated. A color image is thus generated. The color image is projected via the projection optical system 146. The projection optical system 146 includes at least one lens. The projection optical system 146 may include a shiftable projection lens. In this case, the projection optical system 146 is shifted by a lens shift mechanism, not illustrated. By the shift of the projection optical system 146, the position on the projection surface SC, of the image projected from the projection optical system 146, is moved. Furthermore, the amount of movement of the image on the projection surface SC is determined by the amount of shift of the projection optical system 146.

The camera 15 includes a light-receiving optical system 151 such as a lens, and an image pickup element 152 that converts light condensed by the light-receiving optical system 151 to an electrical signal. The image pickup element 152 is, for example, a CCD (charge-coupled device) image sensor that receives light in an infrared range and a visible light range. The image pickup element 152 is not limited to a CCD image sensor and may be, for example, a CMOS (complementary metal-oxide semiconductor) image sensor that receives light in an infrared range and a visible light range.

The camera 15 picks up an image of the projection surface SC and thus generates picked-up image data. The camera 15 of the first projector 1A and the camera 15 of the third projector 1C pick up an image of the first area A1. When the third projector 1C projects a black image as the third image 3C, the camera 15 of the first projector 1A picks up an image of the first image 3A. When the first projector 1A projects a black image as the first image 3A, the camera 15 of the third projector 1C picks up an image of the third image 3C. The camera 15 of the second projector 1B and the camera 15 of the fourth projector 1D pick up an image of the second area A2. When the fourth projector 1D projects a black image as the fourth image 3D, the camera 15 of the second projector 1B picks up an image of the second image 3B. When the second projector 1B projects a black image as the second image 3B, the camera 15 of the fourth projector 1D picks up an image of the fourth image 3D. The black image refers to an image projected by the projector 1, based on an image signal representing an entirely black image. For example, when the first projector 1A projects a black image, the first image 3A is an image entirely in the single color of black.

The picked-up image data generated by the camera 15 is transmitted to the control device 2 by the first communicator 13. The camera 15 of the first projector 1A generates first picked-up image data. The camera 15 of the second projector 1B generates second picked-up image data. The camera 15 of the third projector 1C generates third picked-up image data. The camera 15 of the fourth projector 1D generates fourth picked-up image data. The first picked-up image data, the second picked-up image data, the third picked-up image data, and the fourth picked-up image data are transmitted to the control device 2.

The camera 15 may be provided as a separate unit from the projector 1. In this case, the camera 15 and the projector 1 are connected to each other via a wired or wireless interface so as to be able to transmit and receive data.

The first storage 16 is a recording medium storing data and a program in such a way that the data and the program are readable by the first processor 17. The first storage 16 includes, for example, a non-volatile memory and a volatile memory. The non-volatile memory is, for example, a ROM (read-only memory), an EPROM (erasable programmable read-only memory), or an EEPROM (electrically erasable programmable ROM). The volatile memory is, for example, a RAM.

The first storage 16 stores a control program to be executed by the first processor 17, and various data to be used by the first processor 17.

The first processor 17 is formed of, for example, a single or a plurality of processors. As an example, the first processor 17 is formed of a single or a plurality of CPUs (central processing units). A part or all of the functions of the first processor 17 may be implemented by a circuit such as a DSP (digital signal processor), an ASIC (application-specific integrated circuit), a PLD (programmable logic device), or an FPGA (field-programmable gate array). The first processor 17 executes various kinds of processing in parallel or in sequence. The first processor 17 reads the control program from the first storage 16. The first processor 17 executes the control program and thus implements an operation controller 171 and a corrector 172.

The operation controller 171 controls various operations of the projector 1. For example, the first operation controller 171 controls the first communicator 13, the projecting section 14, and the camera 15.

As an example, the operation controller 171 controls the image processor 141, the light valve driver 143, and the light source 144 and thus causes the projecting section 14 to project an image. The operation controller 171 causes the camera 15 to pick up an image. The operation controller 171 causes the first communicator 13 to transmit picked-up image data to the control device 2.

The corrector 172 corrects the image quality of the image projected from the projecting section 14. The corrector 172 controls the image processor 141, for example, according to various correction data, and thus corrects the brightness of the image and the color of the image.

In an initial state, the corrector 172 causes the image processor 141 to correct the image signal, based on preset initial brightness correction data, and thus corrects the brightness of the image projected by the projecting section 14 from the brightness represented by the image signal before the correction to the brightness represented by the image signal after the correction. The initial brightness correction data is set and stored in the first storage 16 before the shipment of the projector 1, for example, in order to reduce a discrepancy of the brightness of the image from a reference brightness due to an individual variation or the like of the projector 1.

When brightness correction data, described later, that is provided from the control device 2 and the initial brightness correction data exist, the corrector 172 causes the image processor 141 to correct the image signal, based on the initial brightness correction data and the brightness correction data provided from the control device 2, and thus corrects the brightness of the image projected by the projecting section 14 from the brightness represented by the image signal before the correction to the brightness represented by the image signal after the correction. When user-set brightness correction data set by the user exists in addition to the brightness correction data, described later, that is provided from the control device 2 and the initial brightness correction data, the corrector 172 may perform correction using these correction data. Specifically, the corrector 172 causes the image processor 141 to correct the image signal, based on the initial brightness correction data, the user-set brightness correction data, and the brightness correction data provided from the control device 2. Thus, the brightness of the image projected by the projecting section 14 changes from the brightness represented by the image signal before the correction to the brightness represented by the image signal after the correction. The user-set brightness correction data is set by the user when the user adjusts the brightness of the image.

In the initial state, the corrector 172 causes the image processor 141 to correct the image signal, based on preset initial color correction data, and thus corrects the color of the image projected by the projecting section 14 from the color represented by the image signal before the correction to the color represented by the image signal after the correction.

The initial color correction data is set and stored in the first storage 16 before the shipment of the projector 1, for example, in order to reduce a discrepancy of the color of the image from a reference color due to an individual variation or the like of the projector 1.

When color correction data, described later, that is provided from the control device 2 exists, the corrector 172 causes the image processor 141 to correct the image signal, based on the initial color correction data and the color correction data provided from the control device 2, and thus corrects the color of the image projected by the projecting section 14 from the color represented by the image signal before the correction to the color represented by the image signal after the correction. When user-set color correction data set by the user exists in addition to the color correction data, described later, that is provided from the control device 2 and the initial color correction data, the corrector 172 may perform correction using these correction data. Specifically, the corrector 172 causes the image processor 141 to correct the image signal, based on the initial color correction data, the user-set color correction data, and the color correction data provided from the control device 2. Thus, the color of the image projected by the projecting section 14 changes from the color represented by the image signal before the correction to the color represented by the image signal after the correction. The user-set color correction data is set by the user when the user adjusts the color of the image.

3. Configuration of Control Device

Figure 4:
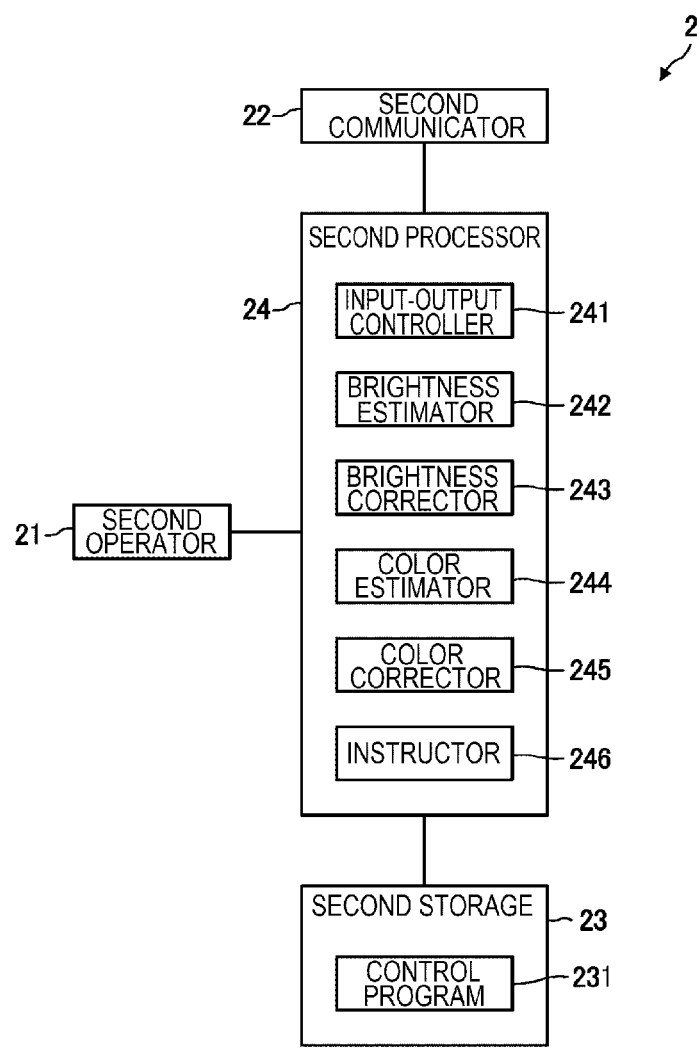
FIG. 4 is a block diagram of a control device.

FIG. 4 shows an example of the control device 2. The control device 2 includes a second operator 21, a second communicator 22, a second storage 23, and a second processor 24.

The second operator 21 is, for example, a keyboard, an operation button, or a touch panel. The second operator 21 accepts an input operation from the user. The second operator 21 can also be referred to as an input interface device.

The second communicator 22 is a communication device that communicates with each of the first projector 1A, the second projector 1B, the third projector 1C, and the fourth projector 1D, and includes a transmitter and a receiver. Specifically, the second communicator 22 communicates with the first communicator 13 via a wired LAN. The form of communication between the second communicator 22 and the first communicator 13 is not limited to a wired LAN. The second communicator 22 receives the first picked-up image data, the second picked-up image data, the third picked-up image data, and the fourth picked-up image data.

The second storage 23 is a recording medium storing a program and data in such a way that the program and the data are readable by the second processor 24. The second storage 23 includes, for example, a non-volatile memory and a volatile memory. The second storage 23 stores a control program 231 to be executed by the second processor 24, and various data to be referred to or processed by the second processor 24.

The second processor 24 is formed of, for example, a single or a plurality of processors. As an example, the second processor 24 is formed of a single or a plurality of CPUs. A part or all of the functions of the second processor 24 may be implemented by a circuit such as a DSP, an ASIC, a PLD, or an FPGA. The second processor 24 executes various kinds of processing in parallel or in sequence. The second processor 24 reads the control program 231 from the second storage 23. The second processor 24 executes the control program 231 and thus implements an input-output controller 241, a brightness estimator 242, a brightness corrector 243, a color estimator 244, a color corrector 245, and an instructor 246.

The input-output controller 241 executes communication with the projector 1 and acquires, via the second communicator 22, the first picked-up image data, the second picked-up image data, the third picked-up image data, the fourth picked-up image data, and other data transmitted from the projector 1.

The brightness estimator 242 estimates the brightness of the first image 3A projected by the first projector 1A. Similarly, the brightness estimator 242 estimates the brightness of the second image 3B, the brightness of the third image 3C, and the brightness of the fourth image 3D.

When the brightness of one or more of the first projector 1A, the second projector 1B, the third projector 1C, and the fourth projector 1D needs correction based on the brightness estimated by the brightness estimator 242, the brightness corrector 243 calculates a correction value. When there is a projector 1 that needs no correction, a correction value may be not calculated or a correction value may be determined with an amount of correction being zero for this projector 1. The brightness corrector 243 may calculate a correction value for all of the projectors 1.

When the brightness corrector 243 has calculated a correction value, the brightness corrector 243 generates brightness correction data based on the calculated correction value and transmits the brightness correction data to one or more of the first projector 1A, the second projector 1B, the third projector 1C, and the fourth projector 1D. The brightness corrector 243 causes the projector 1 to execute brightness adjustment, based on the brightness correction data. The brightness correction data is equivalent to an example of the correction value of the brightness.

The color estimator 244 estimates the color of the first image 3A projected by the first projector 1A. Similarly, the color estimator 244 estimates the color of the second image 3B, the color of the third image 3C, and the color of the fourth image 3D.

When the color of one or more of the first projector 1A, the second projector 1B, the third projector 1C, and the fourth projector 1D needs correction based on the result of the estimation by the color estimator 244, the color corrector 245 calculates a correction value. When there is a projector 1 that needs no correction, a correction value may be not calculated or a correction value may be determined with an amount of correction being zero for this projector 1. A correction value may be calculated for all of the projectors 1.

When the color corrector 245 has calculated a correction value, the color corrector 245 generates color correction data based on the calculated correction value and transmits the color correction data to one or more of the first projector 1A, the second projector 1B, the third projector 1C, and the fourth projector 1D. The color corrector 245 causes the projector 1 to execute color adjustment, based on the color correction data. The color correction data is equivalent to an example of the correction value of the color.

The instructor 246 sends an instruction to each of the first projector 1A, the second projector 1B, the third projector 1C, and the fourth projector 1D. For example, the instructor 246 gives the projector 1 an instruction to project a luminance measurement pattern and an instruction to project a black image, in brightness adjustment processing, described later. Also, for example, the instructor 246 gives the projector 1 an instruction to project a chromaticity measurement pattern and an instruction to project a black image, in color adjustment processing, described later. The instructor 246 transmits, for example, a command to the projector 1 and thus gives the projector 1 an instruction.

4. Operation of Projection System

Figure 5:
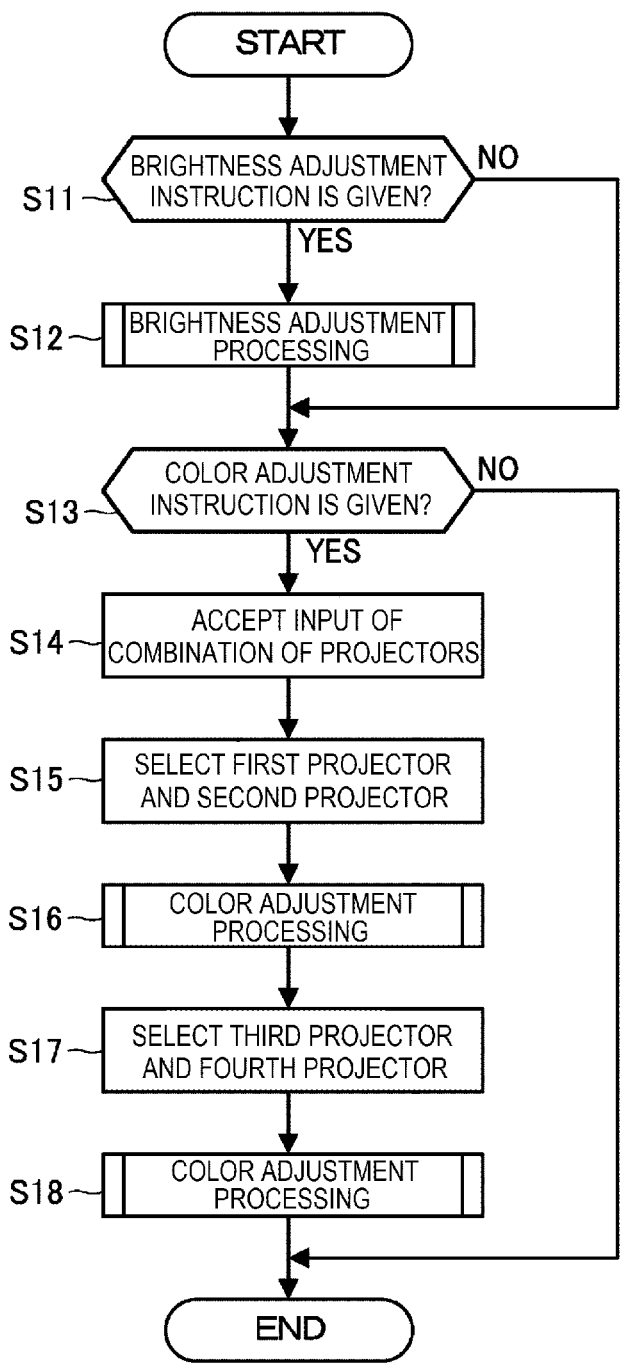
FIG. 5 is a flowchart showing an operation of the display system.
Figure 6:
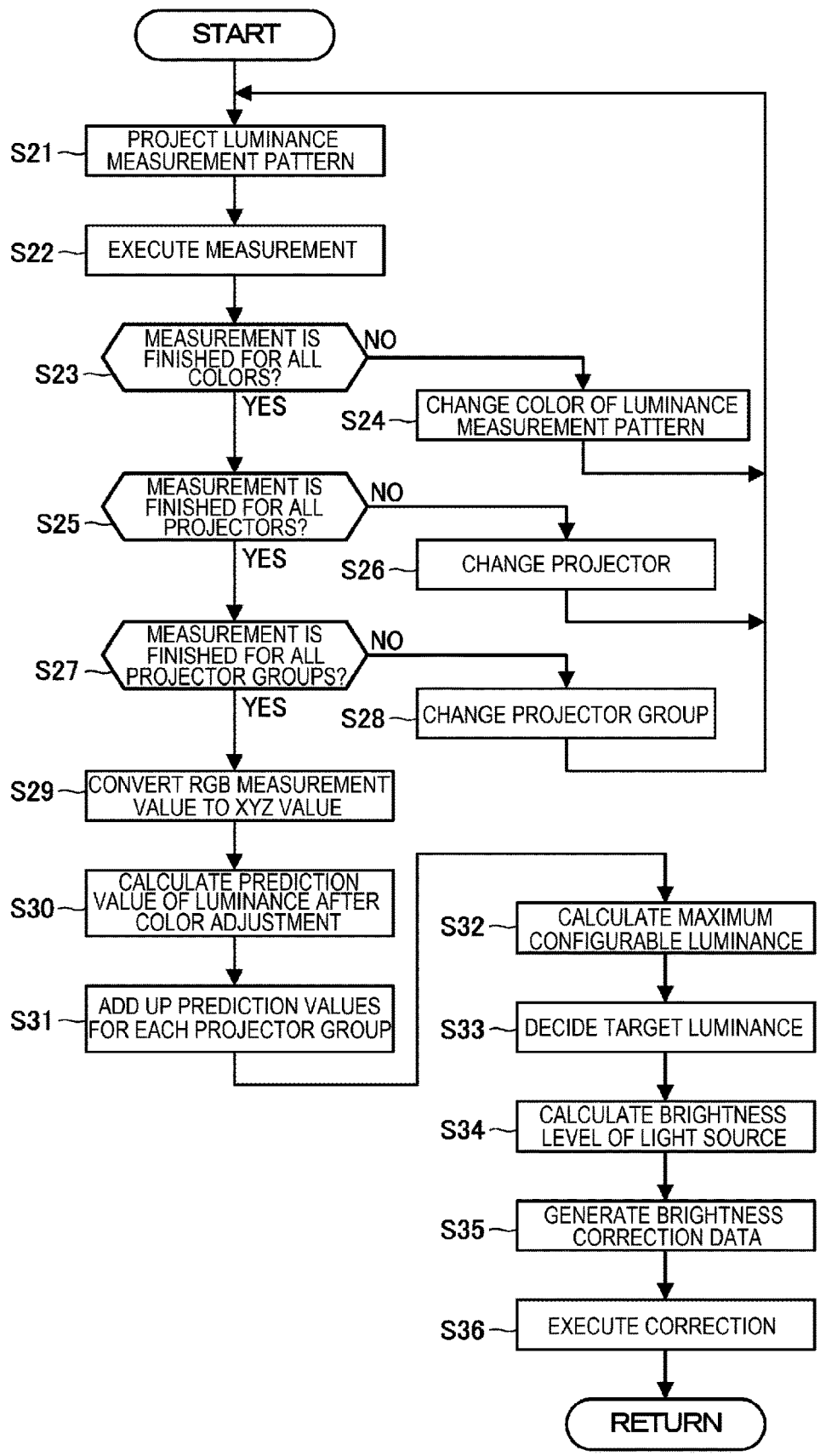
FIG. 6 is a flowchart showing the operation of the display system.
Figure 7:
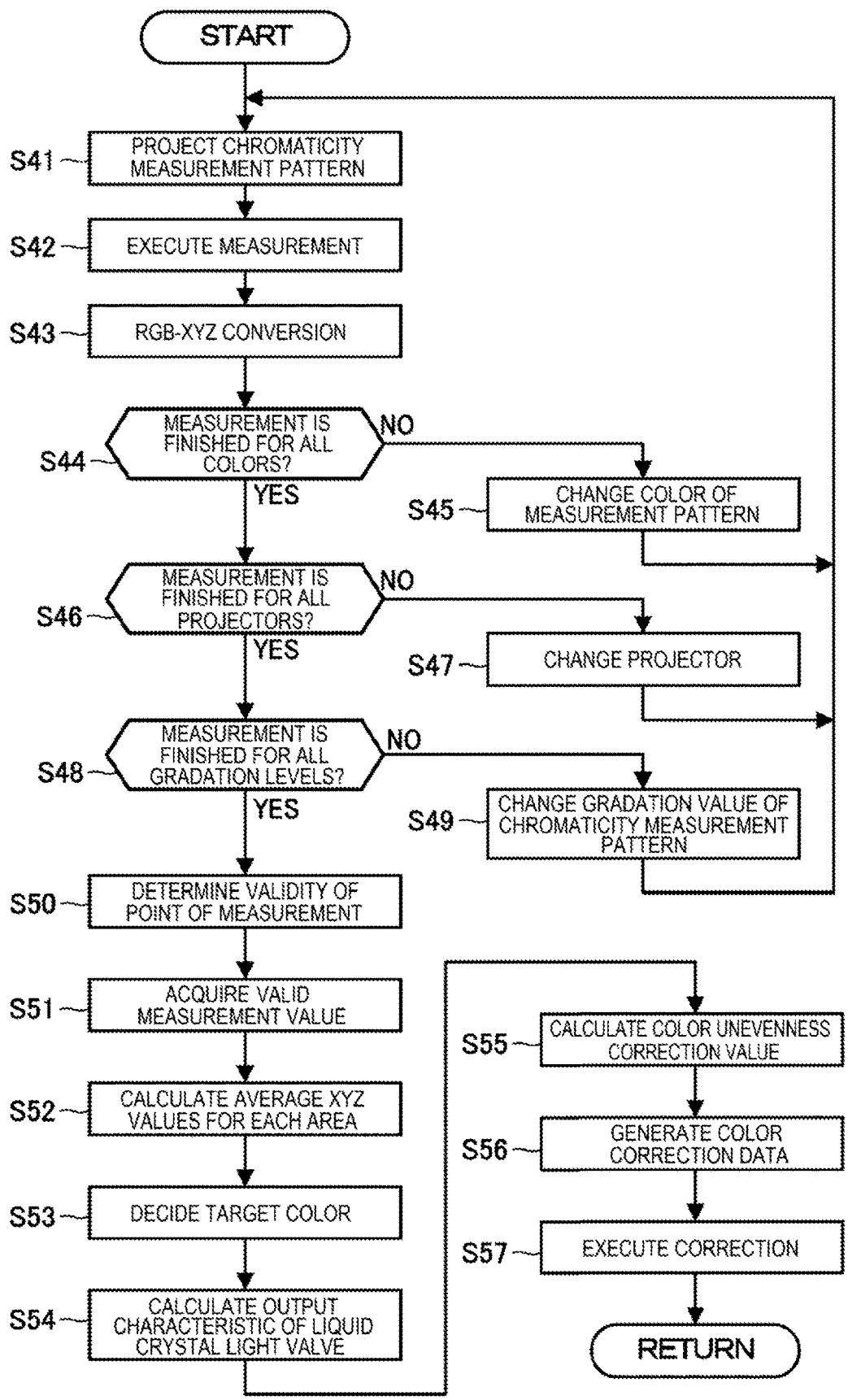
FIG. 7 is a flowchart showing the operation of the display system.

FIGS. 5, 6, and 7 are flowcharts showing an operation of the projection system 1000. The operation of the projection system 1000 will now be described with reference to these flowcharts.

The operation shown in FIG. 5 is executed by the second processor 24.

The control device 2 determines whether an instruction to execute brightness adjustment is given or not (step S11). When an input of an instruction to execute brightness adjustment based on the operation of the second operator 21 by the user is accepted, when control data indicating that an instruction to execute brightness adjustment based on the operation of the first operator 11 is accepted is received from the projector 1, or when a preset condition for the execution of brightness adjustment is satisfied, the control device 2 determines that an instruction to execute brightness adjustment is given (YES in step S11). When an instruction to execute brightness adjustment is not given (NO in step S11), the control device 2 shifts to step S13, described later.

When it is determined that an instruction to execute brightness adjustment is given (YES in step S11), the control device 2 executes brightness adjustment processing (step S12). The brightness adjustment processing in step S12 is processing in which the difference between the brightness of the first projector group 101 and the brightness of the second projector group 102 is reduced, thus resolving or reducing the unevenness in the brightness of the projection image P. Details of the brightness adjustment processing will be described later. After executing the brightness adjustment, the control device 2 shifts to step S13.

In step S13, the control device 2 determines whether an instruction to execute color adjustment is given by the user or not (step S13). When the second operator 21 is operated, when control data indicating that the first operator 11 is operated is received from the projector 1, or when a preset condition for the execution of color adjustment is satisfied, the control device 2 determines that an instruction to execute color adjustment is given (YES in step S13). When an instruction to execute color adjustment is not given (NO in step S13), the control device 2 ends this processing. The operation shown in FIG. 5 is executed by the control device 2 at a preset timing or every predetermined time period.

When it is determined that an instruction to execute color adjustment is given (YES in step S13), the control device 2 accepts an input about a combination of projectors 1 (step S14). The control device 2 executes color adjustment, based on a combination of two projectors 1. The combination of projectors 1 is not limited, provided that it is a combination of a projector 1 projecting an image in the first area A1 and a projector 1 projecting an image in the second area A2. In this embodiment, one of the first projector 1A and the third projector 1C and one of the second projector 1B and the fourth projector 1D can be combined together. In step S14, an input to select one of the first projector 1A and the third projector 1C and an input to select one of the second projector 1B and the fourth projector 1D are accepted. Here, an example where the first projector 1A and the second projector 1B are selected is described. The first projector 1A and the second projector 1B, thus selected, form one combination. The control device 2 defines the projectors 1 that are not selected, as another combination. In this embodiment, the third projector 1C and the fourth projector 1D are selected as another combination. Accepting the input in step S14 is, for example, accepting an input to designate a combination based on the operation of the second operator 21 by the user or receiving, from the projector 1, control data indicating that an input to designate a combination based on the operation of the first operator 11 is accepted.

The control device 2 selects the first projector 1A and the second projector 1B according to the input in step S14 (step S15). The control device 2 executes color adjustment processing, targeting the first projector 1A and the second projector 1B, which are selected (step S16). The color adjustment processing is processing in which the color of one or more of the first projector 1A and the second projector 1B is adjusted so that the color of the first image 3A projected by the first projector 1A and the color of the second image 3B projected by the second projector 1B correspond each other. The color adjustment processing will be described later.

The control device 2 selects a combination of projectors 1 other than the projectors 1 selected according to the input in step S14 (step S17). Specifically, the control device 2 selects the third projector 1C and the fourth projector 1D. The control device 2 executes color adjustment processing, targeting the third projector 1C and the fourth projector 1D, thus selected (step S18). The color adjustment processing in step S18 is similar to the processing in step S16 except for targeting the third projector 1C and the fourth projector 1D.

In this way, the control device 2 executes the brightness adjustment for the first projector 1A, the second projector 1B, the third projector 1C, and the fourth projector 1D, based on the brightness of the first projector group 101 and the second projector group 102. Consequently, the difference in brightness between the first image group 41 and the second image group 42 is corrected and therefore the unevenness in the overall brightness of the projection image P can be resolved or reduced. This operation is more advantageous than when the brightness is adjusted separately for the first projector 1A, the second projector 1B, the third projector 1C, and the fourth projector 1D. That is, the phenomenon of a drop in the brightness of the other projector 1, based on the projector 1 with the lowest brightness, is less likely to occur. Therefore, the degree of drop in the brightness of the projection image P due to brightness adjustment can be reduced.

The control device 2 also executes the color adjustment processing, targeting a combination of one projector 1 projecting an image in the first area A1 and one projector 1 projecting an image in the second area A2. For example, the control device 2 executes the color adjustment processing, targeting different combinations of projectors 1 between step S16 and step S18. As the result of step S16, the unevenness in the color of the first full image E1 is resolved or reduced. In step S18, the unevenness in the color of the second full image E2 is resolved or reduced. Therefore, the unevenness in the color of the projection image P formed of the first full image E1 and the second full image E2 superimposed on each other is resolved or reduced. Thus, the color adjustment for the entire projection image P is properly executed.

In the color adjustment processing in step S16, as described later, information representing the color of the third image 3C and information representing the color of the fourth image 3D are not used. Therefore, information representing the colors of all of the first image 3A, the second image 3B, the third image 3C, and the fourth image 3D need not be acquired or processed and there is an advantage in that the processing load is light. Similarly, in step S18, the control device 2 does not use information representing the color of the first image 3A and information representing the color of the second image 3B. Therefore, there is an advantage in that the processing load is light.

When the brightness of an image projected by the projector 1 is changed, the color of the image projected by the projector 1 may change. Therefore, when the brightness adjustment processing is executed after the color adjustment processing is executed, the color adjustment processing may need to be executed again in order to cope with a change in the color that occurs in the brightness adjustment processing. In this embodiment, the brightness adjustment processing is executed before the color adjustment processing is executed, as shown in FIG. 5. Therefore, the need to execute the color adjustment processing again is less likely to occur and high efficiency is achieved.

FIG. 6 is a flowchart showing the brightness adjustment processing of step S12 in detail. Steps S21 to S28 in FIG. 6 are executed by the color estimator 244 and the instructor 246. Steps S29 to S31 are executed by the brightness estimator 242. Steps S32 to S36 are executed by the brightness corrector 243.

When starting the operation shown in FIG. 6, the control device 2 selects one of the first projector group 101 and the second projector group 102 and selects one projector 1 in the selected projector group.

The control device 2 causes the instructor 246 to give an instruction to the selected projector 1 and thus causes the projector 1 to project a luminance measurement pattern (step S21). As the luminance measurement pattern, for example, a green image that makes an image projected by the projector 1 entirely green, a red image that makes an image projected by the projector 1 entirely red, and a blue image that makes an image projected by the projector 1 entirely blue are prepared in advance. Each of the luminance measurement patterns of the red image, the green image, and the blue image is a raster image with a maximum gradation value. For example, when the projector 1 has 1024 levels of gradation values, the luminance measurement pattern of the green image is an image where all the pixels 145$p$ forming the projection image has a green gradation value of 1023. The luminance measurement patterns of the red image and the blue image are similarly formed. The projector 1 may store display data to display these luminance measurement patterns, in the first storage 16 in advance.

In step S21, when one projector 1 projects the luminance measurement pattern in response to an instruction from the control device 2, the other projector 1 projects a black image Thus, a confusion of projection light in the luminance measurement pattern is prevented.

After the selected projector 1 starts projecting the luminance measurement pattern, the control device 2 executes measurement on the luminance measurement pattern (step S22). In step S22, the control device 2 instructs a projector 1 to execute image pickup and thus acquires picked-up image data. The projector 1 executing image pickup may be preferably the projector 1 selected in step S21. However, the other projector 1 may execute image pickup.

The control device 2 acquires a measurement value from the acquired picked-up image data. The measurement value is RGB data at the coordinates of a point of measurement designated in advance in the picked-up image data. The control device 2 may acquire RGB data of a pixel designated by the coordinates of a point of measurement and RGB data of a predetermined number of pixels in the peripheries of the point of measurement, and may acquire the average value of these RGB data as the measurement value. The number of points of measurement is not limited. For example, the measurement values at ten points of measurement may be acquired from one picked-up image data.

The measurement value acquired by the control device 2 in step S22 is information representing the brightness of the projection image P. Specifically, the measurement value on the luminance measurement pattern of the first projector 1A is information representing the brightness of the first projector 1A. The measurement value on the luminance measurement pattern of the second projector 1B is information representing the brightness of the second projector 1B. The measurement value on the luminance measurement pattern of the third projector 1C is information representing the brightness of the third projector 1C. The measurement value on the luminance measurement pattern of the fourth projector 1D is information representing the brightness of the fourth projector 1D.

The control device 2 determines whether the measurement is finished for all the colors using the luminance measurement patterns of the green image, the red image, and the blue image by the projector 1 selected in step S21, or not (step S23). When it is determined that the measurement is not finished for all the colors (NO in step S23), the control device 2 changes the color of the luminance measurement pattern projected by the projector 1 (step S24), then shifts to step S21, and continues the measurement.

When it is determined that the measurement is finished for all the colors of the green image, the red image, and the blue image (YES in step S23), the control device 2 determines whether the measurement is finished for all the projectors 1 included in the selected projector group or not (step S25). When it is determined that the measurement is not finished for all the projectors 1 (NO in step S25), the control device 2 changes the selected projector 1 (step S26), then returns to step S21, and continues the measurement.

When it is determined that the measurement is finished for all the projectors 1 (YES in step S25), the control device 2 determines whether the measurement is finished for all the projector groups projecting an image onto the projection surface SC or not (step S27). When it is determined that the measurement is not finished for all the projector groups (NO in step S27), the control device 2 changes the selected projector group (step S28), then returns to step S21, and continues the measurement.

When it is determined that the measurement is finished for all the projector groups (YES in step S27), the control device 2 shifts to step S29. The measurement value acquired from the picked-up image data is the RGB value at a plurality of points of measurement for each projector 1. The control device 2 executes RGB-XYZ conversion of the measurement value (step S29). Thus, XYZ data, which is tristimulus values, is acquired as the measurement value of the brightness of each projector 1. Also, in step S29, the control device 2 calculates the average XYZ values of the entire image projected on the projection surface SC, for each projector 1. For example, the control device 2 calculates the average of the XYZ values at a plurality of points of measurement that are the measurement values of the first projector 1A, and thus acquires the average XYZ values of the entirety of the first image 3A. The control device 2 performs similar processing for the second projector 1B, the third projector 1C, and the fourth projector 1D. The processing of step S30 finds a luminance Y in the case where the gradation value of the projector 1 is maximized, for each projector 1.

The control device 2 calculates a prediction value of luminance after the execution of color adjustment, based on the average XYZ values acquired in step S29 (step S30). The color adjustment refers to, for example, the color adjustment processing of steps S16, S18. In the color adjustment processing, the color is corrected in such a way that the RGB balance of the projection light from the projector 1 is appropriate. Therefore, if the RGB balance of the measurement value is extreme at the time of executing the brightness adjustment processing, a large correction performed in the color adjustment processing may have an influence on the brightness of the projection light from the projector 1. Therefore, on the assumption that the color adjustment processing is executed after the brightness adjustment processing shown in FIG. 6, the control device 2 predicts the luminance after the assumed execution of the color adjustment processing and finds the prediction value. Specifically, in step S30, the control device 2 calculates the value of the luminance Y in the state where the RGB output balance is appropriate, as the prediction value.

For example, the control device 2 multiplies each of the Y value found from the R measurement value, the Y value found from the G measurement value, and the Y value found from the B measurement value by a coefficient prepared in advance, then adds up these Y values, and thus calculates the prediction value of the luminance Y, for each projector 1.

Next, the control device 2 adds up the prediction values of the luminance Y of the individual projectors 1 found in step S30, for each projector group (step S31). Specifically, the control device 2 adds up the prediction value of the luminance Y of the first projector 1A and the prediction value of the luminance Y of the third projector 1C and thus calculates the prediction value of the luminance Y of the first projector group 101. The control device 2 performs similar processing for the second projector 1B and the fourth projector 1D and thus calculates the prediction value of the luminance Y of the second projector group 102. The prediction value of the luminance Y of the first projector group 101 is information representing a first brightness of the first image group 41. The prediction value of the luminance Y of the second projector group 102 is information representing a second brightness of the second image group 42.

Next, the control device 2 calculates a maximum configurable luminance for each projector group, based on the prediction value of the luminance Y of each projector group found in step S31 and the set state of the light source 144 in the projector 1 at the time of measurement (step S32). The maximum configurable luminance is an estimated value of the luminance Y acquired when the brightness of the light source 144 of all the projectors 1 included in the projector group is maximized. The maximum value of the brightness in this case may be an upper limit value of the capability of the light source 144 of the projector 1 or may be a maximum value of the brightness under a predetermined condition taking the quality of the image, or the like into account. For example, the maximum value may be up to 1.3 times the current brightness, up to 1.1 times the current brightness, or the like. In this case, the maximum value does not exceed the upper limit value of the capability of the light source 144.

The control device 2 compares the maximum configurable luminance of the first projector group 101 and the maximum configurable luminance of the second projector group 102 and thus determines a target luminance of each projector group (step S33). For example, the control device 2 sets the target luminance, based on the smaller total of the maximum configurable luminance, of the total of the maximum configurable luminance of the first projector group 101 and the total of the maximum configurable luminance of the second projector group 102. For example, based on the ratio between the brightness of the first projector group 101 and the brightness of the second projector group 102, the control device 2 causes the target luminance of the projector group with the higher brightness to be lower than the luminance before adjustment. Thus, the unevenness in the brightness of the projection image P can be resolved and the brightness of the projection image P can be maximized.

The control device 2 calculates the brightness level of the light source 144 of the projector 1, based on the value of the target luminance (step S34). In step S34, the control device 2 calculates the brightness level of the first projector 1A and the brightness level of the third projector 1C, based on the target luminance of the first projector group 101 calculated in step S33. The control device 2 also calculates the brightness level of the second projector 1B and the brightness level of the fourth projector 1D, based on the target luminance of the second projector group 102. For example, the control device 2 calculates the brightness level of each projector 1, based on the ratio between the target luminance based on the ratio between the brightness of the first projector group 101 and the brightness of the second projector group 102, and the estimated value of the luminance Y of each projector 1, for the projector 1 included in the projector group with the relatively higher brightness, of the first projector group 101 and the second projector group 102. The control device 2 determines the maximum configurable luminance of each projector 1 to the brightness level of the projector 1, for the projector 1 included in the projector group with the relatively lower brightness.

The control device 2 generates brightness correction data for the projector 1, based on the brightness level of the projector 1 found in step S34 (step S35). For example, the control device 2 generates brightness correction data for the first projector 1A, based on the brightness level of the first projector 1A. Similarly, the control device 2 generates brightness correction data for the second projector 1B, brightness correction data for the third projector 1C, and brightness correction data for the fourth projector 1D.

The control device 2 transmits the brightness correction data generated in step S35 to each projector 1 and causes the projector 1 to execute brightness correction (step S36).

FIG. 7 is a flowchart showing the color adjustment processing of steps S16, S18 in detail. Steps S41 to S49 in FIG. 7 are executed by the brightness estimator 242 and the instructor 246. Steps S50 to S51 are executed by the color estimator 244. Steps S52 to S57 are executed by the color corrector 245.

When starting the operation shown in FIG. 7, the control device 2 selects one of a plurality of projectors 1 included in a processing target combination. The control device 2 also selects a color of a chromaticity measurement pattern and an initial value of the gradation value of the chromaticity measurement pattern.

The control device 2 causes the instructor 246 to give an instruction to the selected projector 1 and thus causes the projector 1 to project a chromaticity measurement pattern (step S41). As the chromaticity measurement pattern, for example, a green image, a red image, and a blue image are prepared in advance. Each of the green image, the red image, and the blue image is an image that causes an image projected by the projector 1 to be entirely in a single color, for example, a raster image, similarly to the luminance measurement pattern. For each of the green image, the red image, and the blue image, a plurality of chromaticity measurement patterns with different gradation values are prepared. For example, the projector 1 can project seven chromaticity measurement patterns with red gradation values of 150, 300, 450, 600, 750, 900, and 1023, switching between these chromaticity measurement patterns in response to an instruction from the control device 2. For the green image and the blue image, too, the projector 1 can similarly project a plurality of chromaticity measurement patterns with different gradation values. The projector 1 may store display data to display these chromaticity measurement patterns, in the first storage 16 in advance. In step S41, the control device 2 causes the projector 1 to project a chromaticity measurement pattern in a selected color, of the green image, the red image, and the blue image, and with a selected gradation value.

In step S41, when one projector 1 projects the chromaticity measurement pattern in response to an instruction from the control device 2, the other projector 1 projects a black image Thus, a confusion of projection light in the chromaticity measurement pattern is prevented.

After the selected projector 1 starts projecting the chromaticity measurement pattern, the control device 2 executes measurement on the chromaticity measurement pattern (step S42). In step S42, the control device 2 instructs a projector 1 to execute image pickup and thus acquires picked-up image data. The projector 1 executing image pickup may be preferably the projector 1 selected in step S41. However, the other projector 1 may execute image pickup.

The control device 2 acquires a measurement value from the acquired picked-up image data. The measurement value is RGB data at the coordinates of a point of measurement designated in advance in the picked-up image data. The control device 2 may acquire RGB data of a pixel designated by the coordinates of a point of measurement and RGB data of a predetermined number of pixels in the peripheries of the point of measurement, and may acquire the average value of these RGB data as the measurement value. The number of points of measurement is not limited. For example, the measurement values at ten points of measurement may be acquired from one picked-up image data.

The measurement value acquired from the picked-up image data is the RGB value at a plurality of points of measurement. The control device 2 executes RGB-XYZ conversion of the measurement value measured in step S42 (step S43). Thus, XYZ data at the plurality of points of measurement are acquired as the measurement value of the color of the selected projector 1.

The control device 2 determines whether the measurement is finished for all the colors using the chromaticity measurement patterns of the green image, the red image, and the blue image by the projector 1 selected in step S41, or not (step S44). When it is determined that the measurement is not finished for all the colors (NO in step S44), the control device 2 changes the color of the chromaticity measurement pattern projected by the projector 1 (step S45), then shifts to step S41, and continues the measurement.

When it is determined that the measurement is finished for all the colors of the green image, the red image, and the blue image (YES in step S44), the control device 2 determines whether the measurement is finished for all the projectors 1 included in the selected combination or not (step S46). When it is determined that the measurement is not finished for all the projectors 1 (NO in step S46), the control device 2 changes the selected projector 1 (step S47), then returns to step S41, and continues the measurement.

When it is determined that the measurement is finished for all the projectors 1 (YES in step S46), the control device 2 determines whether the measurement using the chromaticity measurement pattern with all the gradation levels is finished or not (step S48). When it is determined that the measurement using the chromaticity measurement pattern with all the gradation levels is not finished (NO in step S48), the control device 2 changes the gradation value of the chromaticity measurement pattern (step S49), then returns to step S41, and continues the measurement.

The measurement value acquired in steps S41 to S49 is equivalent to information representing the color of the image projected by the projector 1. For example, the measurement value of the chromaticity measurement pattern of the first projector 1A is information representing the color of the first image 3A. The measurement value of the chromaticity measurement pattern of the second projector 1B is information representing the color of the second image 3B. The measurement value of the chromaticity measurement pattern of the third projector 1C is information representing the color of the third image 3C. The measurement value of the chromaticity measurement pattern of the fourth projector 1D is information representing the color of the fourth image 3D.

When it is determined that the measurement using the chromaticity measurement pattern with all the gradation levels is finished (YES in step S48), the control device 2 determines the validity of the point of measurement (step S50). In step S50, the control device 2 determines the validity of the measurement value acquired from the picked-up image data, for each point of measurement. When performing the processing of step S50, the control device 2 has the measurement value using the chromaticity measurement pattern with each gradation level, of the colors of green, red, and blue, for a plurality of points of measurement, and these measurement values have been XYZ-converted.

As the method for determination in step S50, for example, five examples can be given.

As a first determination method, when the control device 2 has failed in the RGB-XYZ conversion of a measurement value, the control device 2 determines that the point of measurement corresponding to the measurement value is an invalid point of measurement.

As a second determination method, the control device 2 compares measurement values resulting from the measurement on the chromaticity measurement pattern in the same color but with different gradation values, and determines that a measurement value having XYZ values that do not increase as the gradation value increases is not valid. For example, the control device 2 has an X value, a Y value, and a Z value about seven green images measured on seven gradation levels. The control device 2 compares the seven X values and determines whether the seven X values have a correlation such that the X value increases as the gradation value increases, or not. The control device 2 performs similar determination for the Y value and the Z value. Also, the control device 2 performs similar determination for the XYZ values of the red image and the XYZ values of the blue image.

When any measurement value does not satisfy the foregoing correlation in terms of any of the X value, the Y value, and the Z value, for any of the green image, the red image, and the blue image, the control device 2 determines that the point of measurement corresponding to this measurement value is an invalid point of measurement.

As a third determination method, the control device 2 determines whether the balance of the XYZ values of the green image, the red image, and the blue image at one gradation value of one color corresponds to the color of the chromaticity measurement pattern or not. For example, when the Y value of the measurement value of the green image is higher than the X value and the Z value, the X value of the measurement value of the red image is higher than the Y value and the Z value, and the Z value of the measurement value of the blue image is higher than the X value and the Y value, the balance of the XYZ values corresponds to the color of the chromaticity measurement pattern. The control device 2 compares the X value, the Y value, and the Z value included in the measurement value. When the balance of the XYZ values does not correspond to the color of the chromaticity measurement pattern, the control device 2 determines the point of measurement corresponding to this measurement value, as an invalid point of measurement.

As a fourth determination method, the control device 2 determines whether the difference between the measurement value of any point of measurement and the measurement value of a point of measurement adjacent thereto is within a predetermined range or not. This determination is performed, for example, for each of the X value, the Y value, and the Z value. The control device 2 determines a point of measurement having a difference in measurement value from that of an adjacent point of measurement that exceeds the predetermined range, as an invalid point of measurement.

As a fifth determination method, the control device 2 determines a point of measurement where spot light is likely to appear, as invalid. The spot light refers to reflected light of the projection light projected from the projector 1 adjacent to the projector 1 performing the measurement and reflected by the projection surface SC. In step S50, for example, the control device 2 extracts the Y values of chromaticity measurement patterns with the highest gradation value of the green images, from the measurement values of all the points of measurement, and finds the median value of the Y values. The control device 2 determines a predetermined number of measurement values having a Y value that is the farthest from the median value, as an invalid measurement value, and determines the points of measurement corresponding to the invalid measurement values as invalid.

In step S50, the control device 2 determines the validity of the point of measurement, using one of the foregoing first to fifth determination methods or a combination of a plurality of the determination methods. For example, the control device 2 performs determination using the first to fourth determination methods for all the points of measurement and determines a point of measurement determined as invalid by any of these determination methods, as invalid. Also, for example, the control device 2 may perform determination using the fifth determination method, for a point of measurement determined as valid by all of the first to fourth determination methods. In this case, a point of measurement determined as valid by the fifth determination method may be determined as a valid point of measurement. Also, the control device 2 may perform determination using the first to fifth determination methods for all the points of measurement, then sum up the results of determination about validity and invalidity by each determination method, and thus determine the validity of the points of measurement. For example, a point of measurement determined as invalid a number of times that is equal to or greater than a threshold may be determined as an invalid point of measurement.

The control device 2 acquires the measurement value of the point of measurement determined as valid in step S50 (step S51). The control device 2 calculates the average XYZ values for each area on the projection surface SC, based on the acquired measurement value, for each projector 1 (step S52). That is, the control device 2 calculates the average of the X values, the average of the Y values, and the average of the Z values for the first area A1, and calculates the average of the X values, the average of the Y values, and the average of the Z values for the second area A2.

The control device 2 compares the average XYZ values of a plurality of projectors 1 and thus determines a target color (step S53). For example, the control device 2 defines one of a plurality of projectors 1 belonging to a processing target combination, as a reference projector. The control device 2 determines the target color of the reference projector 1 according to a correction target chromaticity of all the projectors 1 belonging to the processing target combination. The correction target chromaticity refers to an appropriate balance of the XYZ values, for example, the XYZ values when the projector 1 projects a white image with an appropriate color tone. The white image refers to an image projected by the projector 1, based on an image signal that makes an image entirely white. For example, when the first projector 1A projects a white image, the first image 3A is an entirely white image. Next, the control device 2 determines the target color of the other projector 1 belonging to the processing target combination, according to the target color of the reference projector 1.

The control device 2 calculates an output characteristic of the liquid crystal light valve 145 for each projector 1, based on the XYZ values, which are the measurement value acquired from the chromaticity measurement pattern with a plurality of gradation values (step S54). The output characteristic refers to, for example, the ratio of the X value, the Y value and the Z value of the liquid crystal light valve 145. In step S54, the control device 2 calculates the output characteristic of each of the liquid crystal light valve for red 145R, the liquid crystal light valve for green 145G, and the liquid crystal light valve for blue 145B, for each projector 1.

The control device 2 calculates a color unevenness correction value for each projector 1, based on the target color found in step S53 and the output characteristic of the liquid crystal light valve 145 calculated in step S54 (step S55). The color unevenness correction value is a correction value to correct a color unevenness within the plane of the image projected by the projector 1 and is found at every coordinates in the image. The coordinates in the image projected by the projector 1 via the projecting section 14 correspond to the coordinates of the pixels in the liquid crystal light valve 145.

The control device 2 generates color correction data for each projector 1, based on the color unevenness correction value (step S56). The control device 2 transmits the color correction data generated in step S56 to each projector 1 and causes the projector 1 to execute color correction (step S57).

In the projection system 1000, the operation shown in FIG. 7 is executed, targeting the combination of the first projector 1A and the second projector 1B in step S16, and the color of the first image 3A and the second image 3B is thus adjusted. Similarly, the operation shown in FIG. 7 is executed, targeting the combination of the third projector 1C and the fourth projector 1D in step S18, and the color of the third image 3C and the fourth image 3D is thus adjusted. Thus, the color of the entire projection image P is adjusted.

5. Other Embodiments

The foregoing embodiment is a preferred embodiment of the present disclosure. However, the present disclosure is not limited to this embodiment and can be implemented with various modifications without departing from the spirit and scope of the present disclosure.

In the foregoing embodiment, a configuration where four projectors 1 project an image in the first area A1 and the second area A2 on the projection surface SC is described. However, this is an example. The present disclosure can also be applied to a configuration where five or more projectors 1 project an image in three or more areas on the projection surface SC.

In the foregoing embodiment, a configuration where the projecting section 14 provided in the projector 1 modulates light via the liquid crystal light valve 145 formed of a transmission-type liquid crystal panel is described. However, this is an example. For example, the projector 1 may be configured to modulate light via a reflection-type liquid crystal panel or may be configured with a digital micromirror device.

Each functional unit illustrated in FIGS. 3 and 4 represents a functional configuration and is not particularly limited to any specific form of installation. A piece of hardware individually corresponding to each of the illustrated functional units need not necessarily be installed. A single processor may be configured to execute a program and thus implement functions of a plurality of functional units. A part of the functions implemented by software in the foregoing embodiments may be implemented by hardware. A part of the functions implemented by hardware may be implemented by software.

The processing steps in the flowcharts shown in FIGS. 5, 6, and 7 are provided by dividing the processing according to the main content of the processing in order to facilitate the understanding of the processing in the projection system 1000. The way the processing is divided into processing steps and the names of the processing steps do not limit the present disclosure. The processing may also be divided into more steps according to the content of the processing. The processing may also be divided in such a way that one processing step includes more processing. The order of the processing in the foregoing flowcharts is not limited to the illustrated example.

The control program 231 can be recorded, for example, in a recording medium in such a way as to be readable by the second processor 24. As the recoding medium, a magnetic or optical recording medium or a semiconductor memory device can be used. Specifically, a portable recording medium such as a flexible disk, a CD-ROM (compact disc read-only memory), a DVD, a Blu-ray disk, a magneto-optical disk, a flash memory or a card-type recording medium, or a fixed recording medium may be employed. The control program 231 can also be stored in a server device or the like in advance and can be downloaded from the server device to implement the foregoing control method.

6. Summary of Present Disclosure

Supplementary notes are given below as a summary of the present disclosure.

Supplementary Note 1

An information processing method includes: determining a brightness of a first projector included in a first projector group including a plurality of projectors, based on a first brightness of a first image group projected in a first area on a projection surface by the first projector group and a second brightness of a second image group projected in a second area on the projection surface partly overlapping the first area by a second projector group that includes a plurality of projectors and that is different from the first projector group; and determining at least one of a correction value of a color used by the first projector and a correction value of a color used by a second projector included in the second projector group, based on a color of a first image projected in the first area by the first projector and a color of a second image projected in the second area by the second projector.

Thus, when adjusting the brightness and color of a projection image, the brightness of the projector can be determined, based on the brightness of the first image group and the second image group. Therefore, the influence of the brightness of one projector in the processing to adjust the brightness of the projection image can be reduced. Therefore, even when a projector with a low brightness is included in the first projector group or the second projector group, the adjustment can be executed without significantly reducing the brightness of the projection image. Also, since at least one of the correction value of the color used by the first projector and the correction value of the color used by the second projector is determined based on the color of the first image and the color of the second image, an unevenness in color can be adjusted. Thus, the unevenness in color and the brightness of projection images from a plurality of projectors can be adjusted.

Supplementary Note 2

The information processing method according to Supplementary Note 1 may further include accepting an input designating a set of one of the plurality of projectors included in the first projector group and one of the plurality of projectors included in the second projector group. The first projector and the second projector may be included in one set designated by the input.

Thus, the processing to adjust the unevenness in the color of the projection image can be executed, based on a combination of projectors designated by the user.

Supplementary Note 3

The information processing method according to Supplementary Note 1 or 2 may further include determining at least one of a correction value of a color used by a third projector included in the first projector group and a correction value of a color used by a fourth projector included in the second projector group, based on a color of a third image projected in the first area by the third projector and a color of a fourth image projected in the second area by the fourth projector. Determining at least one of the correction value of the color used by the first projector and the correction value of the color used by the second projector may include determining at least one of the correction value of the color used by the first projector and the correction value of the color used by the second projector, without using the color of the third image or the color of the fourth image.

Thus, since the correction values for the first projector and the second projector can be determined without using the color of the third projector or the color of the fourth projector, the correction values can be determined from a small volume of information. Therefore, the processing load in the processing to adjust the color can be reduced and the color of the projection image can be efficiently adjusted.

Supplementary Note 4

In the information processing method according to one of Supplementary Notes 1 to 3, the first brightness may be a total of the brightness of the first image projected in the first area by the first projector and the brightness of a third image projected in the first area by a third projector included in the first projector group. The second brightness may be a total of the brightness of the second image projected in the first area by the second projector and the brightness of a fourth image projected in the second area by a fourth projector included in the second projector group.

Thus, since the total of the brightness of images projected by a plurality of projectors is used, the influence of the low brightness of a particular projector can be reduced and the brightness can be adjusted in such a way that the projection image does not become excessively dark.

Supplementary Note 5

In the information processing method according to one of Supplementary Notes 1 to 4, adjusting the brightness of the first projector may include reducing the brightness of the first projector, based on a ratio of the second brightness and the first brightness, when the second brightness is lower than the first brightness.

Thus, the brightness of the first projector is adjusted, based on the ratio of the brightness of the first projector group and the brightness of the second projector group. Therefore, the brightness of individual projectors can be adjusted, based on the comparison between the brightness of the first image group and the brightness of the second image group.

Supplementary Note 6

In the information processing method according to one of Supplementary Notes 1 to 5, determining at least one of the correction value of the color used by the first projector and the correction value of the color used by the second projector may be performed when adjusting the brightness of the first projector is complete.

According to this method, the adjustment of the color need not be performed again even when the color changes due to the adjustment of the brightness of the image projected by the projector. Thus, the adjustment of the brightness and the adjustment of the color can be efficiently performed.

Supplementary Note 7

The information processing method according to one of Supplementary Notes 1 to 6 may further include: acquiring the first brightness, based on a picked-up image acquired by picking up an image of the first area where the first image group is displayed; acquiring the second brightness, based on a picked-up image acquired by picking up an image of the second area where the second image group is displayed; acquiring the color of the first image, based on a picked-up image acquired by picking up an image of the first area where the first image is displayed; and acquiring the color of the second image, based on a picked-up image acquired by picking up an image of the second area where the second image is displayed.

Thus, the adjustment of the brightness can be performed, using the picked-up image formed by picking up an image of the projection image.

Supplementary Note 8

An information processing device includes at least one processor. The at least one processor executes: determining a brightness of a first projector included in a first projector group including a plurality of projectors, based on a first brightness of a first image group projected in a first area on a projection surface by the first projector group and a second brightness of a second image group projected in a second area on the projection surface partly overlapping the first area by a second projector group that includes a plurality of projectors and that is different from the first projector group; and determining at least one of a correction value of a color used by the first projector and a correction value of a color used by a second projector included in the second projector group, based on a color of a first image projected in the first area by the first projector and a color of a second image projected in the second area by the second projector.

Thus, the influence of the brightness of one projector in the processing to adjust the brightness of the projection image can be reduced. Therefore, even when a projector with a low brightness is included in the first projector group or the second projector group, the adjustment can be executed without significantly reducing the brightness of the projection image. Also, since at least one of the correction value of the color used by the first projector and the correction value of the color used by the second projector is determined based on the color of the first image and the color of the second image, an unevenness in color can be adjusted. Thus, the unevenness in color and the brightness of projection images from a plurality of projectors can be adjusted by a method that is less likely to lower the brightness of the projection image.

Supplementary Note 9

A program executable by a computer causes the computer to execute: determining a brightness of a first projector included in a first projector group including a plurality of projectors, based on a first brightness of a first image group projected in a first area on a projection surface by the first projector group and a second brightness of a second image group projected in a second area on the projection surface partly overlapping the first area by a second projector group that includes a plurality of projectors and that is different from the first projector group; and determining at least one of a correction value of a color used by the first projector and a correction value of a color used by a second projector included in the second projector group, based on a color of a first image projected in the first area by the first projector and a color of a second image projected in the second area by the second projector.

Thus, the influence of the brightness of one projector in the processing to adjust the brightness of the projection image can be reduced. Therefore, even when a projector with a low brightness is included in the first projector group or the second projector group, the adjustment can be executed without significantly reducing the brightness of the projection image. Also, since at least one of the correction value of the color used by the first projector and the correction value of the color used by the second projector is determined based on the color of the first image and the color of the second image, an unevenness in color can be adjusted. Thus, the unevenness in color and the brightness of projection images from a plurality of projectors can be adjusted by a method that is less likely to lower the brightness of the projection image.

What is claimed is:

1. An information processing method comprising:
    determining a brightness of a first projector included in a first projector group including a plurality of projectors, based on a first brightness of a first image group projected in a first area on a projection surface by the first projector group and a second brightness of a second image group projected in a second area on the projection surface partly overlapping the first area by a second projector group that includes a plurality of projectors and that is different from the first projector group; and
    determining at least one of a correction value of a color used by the first projector and a correction value of a color used by a second projector included in the second projector group, based on a color of a first image projected in the first area by the first projector and a color of a second image projected in the second area by the second projector.

2. The information processing method according to claim 1, further comprising:
    accepting an input designating a set of one of the plurality of projectors included in the first projector group and one of the plurality of projectors included in the second projector group, wherein
    the first projector and the second projector are included in one set designated by the input.

3. The information processing method according to claim 1, further comprising:
    determining at least one of a correction value of a color used by a third projector included in the first projector group and a correction value of a color used by a fourth projector included in the second projector group, based on a color of a third image projected in the first area by the third projector and a color of a fourth image projected in the second area by the fourth projector, wherein
    the determining at least one of the correction value of the color used by the first projector and the correction value of the color used by the second projector includes determining at least one of the correction value of the color used by the first projector and the correction value of the color used by the second projector, without using the color of the third image or the color of the fourth image.

4. The information processing method according to claim 1, wherein
the first brightness is a total of brightness of the first image projected in the first area by the first projector and brightness of a third image projected in the first area by a third projector included in the first projector group, and
the second brightness is a total of brightness of the second image projected in the first area by the second projector and brightness of a fourth image projected in the second area by a fourth projector included in the second projector group.

5. The information processing method according to claim 1, wherein
the adjusting the brightness of the first projector includes reducing the brightness of the first projector, based on a ratio of the second brightness and the first brightness, when the second brightness is lower than the first brightness.

6. The information processing method according to claim 1, wherein
the determining at least one of the correction value of the color used by the first projector and the correction value of the color used by the second projector is performed when the adjusting the brightness of the first projector is complete.

7. The information processing method according to claim 1, further comprising:
acquiring the first brightness, based on a picked-up image acquired by picking up an image of the first area where the first image group is displayed;
acquiring the second brightness, based on a picked-up image acquired by picking up an image of the second area where the second image group is displayed;
acquiring the color of the first image, based on a picked-up image acquired by picking up an image of the first area where the first image is displayed; and
acquiring the color of the second image, based on a picked-up image acquired by picking up an image of the second area where the second image is displayed.

8. An information processing device comprising at least one processor,
the at least one processor executing:
determining a brightness of a first projector included in a first projector group including a plurality of projectors, based on a first brightness of a first image group projected in a first area on a projection surface by the first projector group and a second brightness of a second image group projected in a second area on the projection surface partly overlapping the first area by a second projector group that includes a plurality of projectors and that is different from the first projector group; and
determining at least one of a correction value of a color used by the first projector and a correction value of a color used by a second projector included in the second projector group, based on a color of a first image projected in the first area by the first projector and a color of a second image projected in the second area by the second projector.

9. A non-transitory computer-readable storage medium storing a program executable by a computer,
the program causing the computer to execute:
determining a brightness of a first projector included in a first projector group including a plurality of projectors, based on a first brightness of a first image group projected in a first area on a projection surface by the first projector group and a second brightness of a second image group projected in a second area on the projection surface partly overlapping the first area by a second projector group that includes a plurality of projectors and that is different from the first projector group; and
determining at least one of a correction value of a color used by the first projector and a correction value of a color used by a second projector included in the second projector group, based on a color of a first image projected in the first area by the first projector and a color of a second image projected in the second area by the second projector.

* * * * *